(12) United States Patent
Middel (10) Patent No.: US 10,569,822 B2
(45) Date of Patent: Feb. 25, 2020

(54) BICYCLE FRAME AND BOTTOM BRACKET THEREOF

(71) Applicant: IDEAL BIKE CORPORATION, Taichung (TW)

(72) Inventor: Lennart Pieter Middel, Taichung (TW)

(73) Assignee: IDEAL BIKE CORPORATION, Taichung (TW)

( * ) Notice: Subject to any disclaimer, the term of this patent is extended or adjusted under 35 U.S.C. 154(b) by 149 days.

(21) Appl. No.: 15/812,717

(22) Filed: Nov. 14, 2017

(65) Prior Publication Data

US 2019/0111991 A1   Apr. 18, 2019

(30) Foreign Application Priority Data

Oct. 16, 2017   (TW) .............................. 106135342 A (51) Int. Cl.
| | | |
|---|---|---|
| B60C 23/10 | (2006.01) | |
| B60C 23/16 | (2006.01) | |
| B62J 11/02 | (2006.01) | |
| B62K 19/34 | (2006.01) | |
| B62K 19/40 | (2006.01) | |
| B62K 19/42 | (2006.01) | |
| B62K 3/02 | (2006.01) | |
| B62K 19/04 | (2006.01) | |

(52) U.S. Cl.
CPC .............. B62K 19/42 (2013.01); B62K 19/34 (2013.01); B62K 19/40 (2013.01); B62K 3/02 (2013.01); B62K 19/04 (2013.01)

(58) Field of Classification Search
CPC .. B62J 11/02; B62J 9/001; B62J 9/005; B60C 23/16; B60C 23/105; B62K 19/42; B62K 19/34; B62K 19/40

USPC ..... 280/201, 202, 216, 281.1; 224/414, 425, 224/427, 926

See application file for complete search history.

(56) References Cited

U.S. PATENT DOCUMENTS

| 554,084 | A | * | 2/1896 | Ostrander |
| 857,845 | A | * | 9/1900 | Wolbrecht |
| 679,512 | A | * | 7/1901 | Rock |

(Continued)

FOREIGN PATENT DOCUMENTS

| FR | 593604 | * | 8/1925 | |
| FR | 2660253 | * | 10/1991 | ............ B60C 29/00 |
| FR | 2814139 | * | 3/2002 | ............ B62J 11/00 |

*Primary Examiner* — Anne Marie M Boehler
(74) *Attorney, Agent, or Firm* — R. Lynette Wylie; Apex Juris, pllc.

(57) ABSTRACT

A bottom bracket for a frame of a bicycle and the frame thereof are disclosed. The frame includes a head tube, a connection member, and two chain stays; one end of the connection member is connected to the head tube; the bottom bracket is adapted to be connected to another end of the connection member and the two chain stays; in a forward direction of the bicycle, the head tube is located at a front side of the bottom bracket, while the two chain stays are located in a rear side of the bottom bracket; the bottom bracket is characterized in that: the bottom bracket comprises at least one joint hole, adapted to receive a bottleneck of at least one compressed air bottle to secure the compressed air bottle to the frame; the secured at least one compressed air bottle is located at the rear side of the bottom bracket.

16 Claims, 8 Drawing Sheets

(56) References Cited

U.S. PATENT DOCUMENTS

| | | | | |
|---|---|---|---|---|
| 802,695 | A | * | 10/1905 | Ingham |
| 849,227 | A | * | 4/1907 | Genelley et al. |
| 5,890,725 | A | * | 4/1999 | Wood .................... B62K 19/42<br>280/201 |
| 6,189,905 | B1 | * | 2/2001 | Yelverton .............. B62K 25/08<br>280/201 |
| 9,487,257 | B1 | * | 11/2016 | Enriquez .................. B62J 11/00 |
| 10,308,303 | B2 | * | 6/2019 | Chuang ..................... B62J 1/28 |
| 2010/0264184 | A1 | * | 10/2010 | Retief ..................... B62J 11/00<br>224/427 |
| 2016/0271635 | A1 | * | 9/2016 | Carrozza ............ B05B 13/0278 |

* cited by examiner

BICYCLE FRAME AND BOTTOM BRACKET THEREOF

BACKGROUND OF THE INVENTION

1. Technical Field

The present invention is related to bicycles, and more particularly to a bicycle frame which can be assembled with a compressed air bottle and a bottom bracket thereof.

2. Description of Related Art

In recent years, since environmental protection and associated energy saving and carbon reduction regimes has drawn people's attention and been promoted by the Government, bicycle riding has become popular again. However, in bicycle riding or a bicycle race, the bicycle rider may encounter the problems of tire puncture or losing air with tires which may impede the bicycle rider from continuing riding.

Therefore, in order to avoid the above problems mentioned, the bicycle rider would carry an inflator together with a bicycle inner tube or tire patches so as to facilitate the repairing or replacing of the tire when it blows out or loses air.

However, the conventional inflators usually have a low inflating rate and a large size which are not convenient for the bicycle rider to carry during his riding trip. Besides, the conventional inflators usually extend the process time required for replacing or repairing the tire. Hence, a compressed air bottle filled with compressed air has come into the market. By aligning the bottleneck of the compressed air bottle to the valve of the tire, the repaired tire could be rapidly inflated with the compressed air released from the compressed air bottle. It not only decreases the load carried by the bicycle rider, but also greatly reduces the time required for repairing or replacing the tire. Nevertheless, since the compressed air bottle has a small size and a light weight, the bicycle rider sometimes would lose it because of carelessness or spend time on looking for it and therefore it is still inconvenient on use of the compressed air bottle.

BRIEF SUMMARY OF THE INVENTION

It is thus an important object of the present invention to provide a bicycle frame and a bottom bracket thereof which could be assembled with a compressed air bottle, thereby improving the convenience of carrying the compressed air bottle.

According to one embodiment, a frame for a bicycle is provided. The frame includes a head tube, a connection member, a bottom bracket, two seat stays and two chain stays, wherein, the connection member connects the head tube to the bottom bracket, while one end of each of the two chain stays is connected to the bottom bracket; in a forward direction of the bicycle, the head tube is located at a front side of the bottom bracket, while the two chain stays are located at a rear side of the bottom bracket. The frame includes the bottom bracket comprises at least one joint hole adapted to receive a bottleneck of a compressed air bottle to secure the compressed air bottle to the frame wherein the compressed air bottle being secured is located at the rear side of the bottom bracket.

According to another embodiment, a bottom bracket for a frame of a bicycle is disclosed wherein the frame includes a head tube, a connection member, and two chain stays; one end of the connection member is connected to the head tube; the bottom bracket is adapted to be connected to another end of the connection member and the two chain stays; in a forward direction of the bicycle, the head tube is located at a front side of the bottom bracket, while the two chain stays are located in a rear side of the bottom bracket. The bottom bracket is characterized in that: the bottom bracket comprises at least one joint hole, adapted to receive a bottleneck of at least one compressed air bottle to secure the compressed air bottle to the frame; the secured at least one compressed air bottle is located at the rear side of the bottom bracket.

According to one embodiment, in a riding state of the bicycle, the secured compressed air bottle is located within an area enclosed by the bottom bracket and the two chain stays as viewed from a top of the connection member.

According to one embodiment, the bottleneck of the compressed air bottle includes threads to be engaged with corresponding threads formed on an interior sidewall of the at least one joint hole.

According to one embodiment, the at least one joint hole is disposed on the bottom bracket and is within an area enclosed by the bottom bracket and the two chain stays.

According to one embodiment, the bottom bracket includes a first joint arm and a second joint arm; the two chain stays are respectively connected to the first arm and the second arm of the bottom bracket; the at least one joint hole is disposed between the first joint arm and the second joint arm.

According to one embodiment, a length of the first joint arm is not equal to that of the second joint arm.

According to one embodiment, the first arm longitudinally extends in a predetermined direction, while the second joint arm has a first arm section and a second arm section which are connected in sequence and respectively extend in different directions.

According to one embodiment, the first joint arm, the first arm section and the second arm section respectively extend in different directions.

According to one embodiment, the bottom bracket further includes a blocking lever disposed between the first joint arm and the second joint arm; the blocking lever has two ends respectively connected to the first joint arm and the second joint arm; part of the compressed air bottle being secured is located within a space enclosed by the blocking lever, the first joint arm, and the second joint arm.

According to one embodiment, the bottom bracket includes a body; the two chain stays are connected to a portion of the bottom bracket while the portion is joined to the body via at least one joint end; the at least one joint hole is disposed on the body and is located within an area enclosed by exterior points of the at least one joint end joined between the portion and the body.

According to one embodiment, the blocking lever includes at least one hollow part.

According to one embodiment, a material of the bottom bracket includes metal, carbon fiber, plastic steel or plastic.

By utilizing the frame and the bottom bracket mentioned above, the compressed air bottle can be directly assembled to the frame or the bottom bracket so that it can effectively improve the convenience for a bicycle rider to carry the compressed air bottle.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
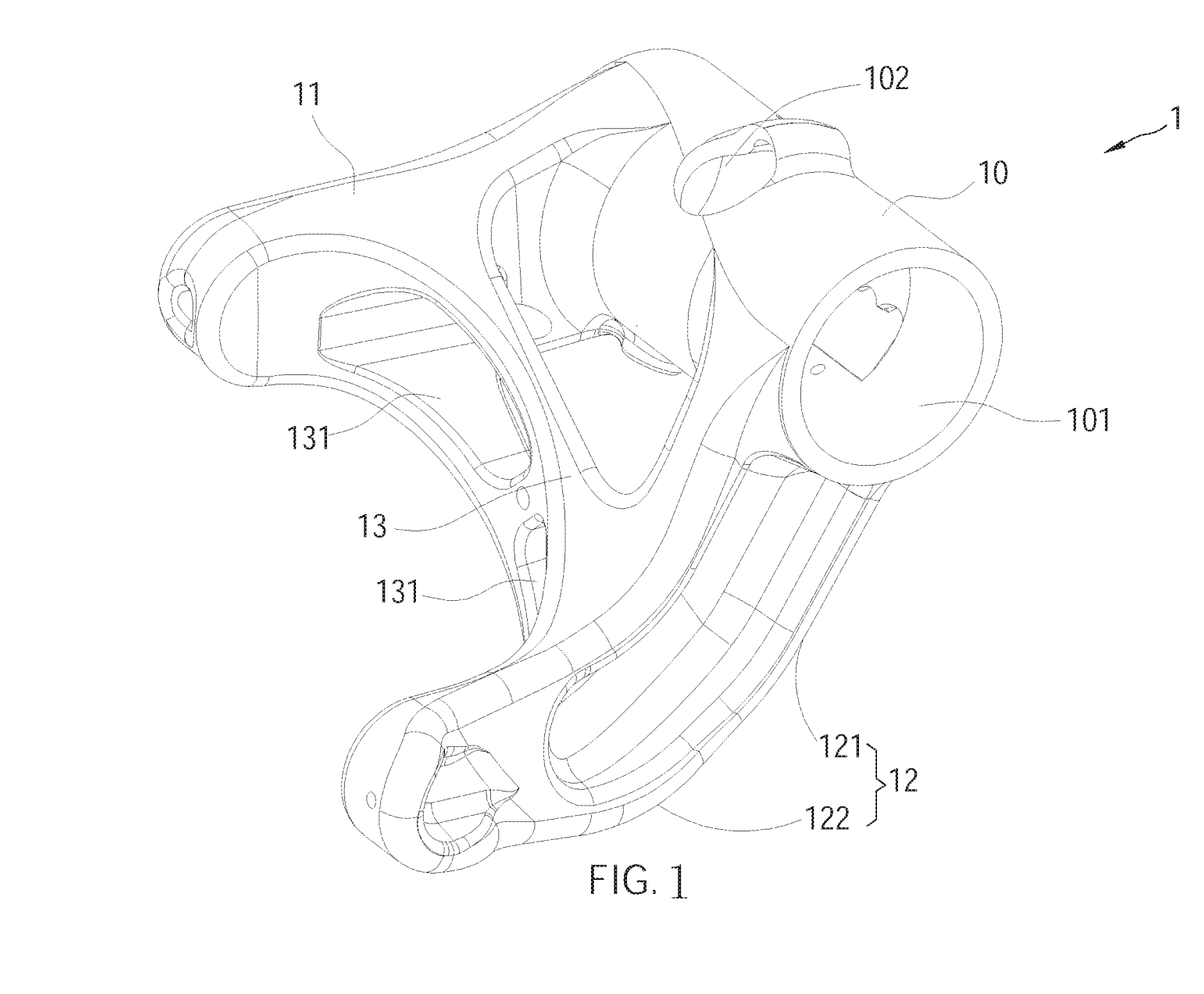
FIG. 1 illustrates a perspective view of a bottom bracket of an embodiment according to the present invention.
Figure 2:
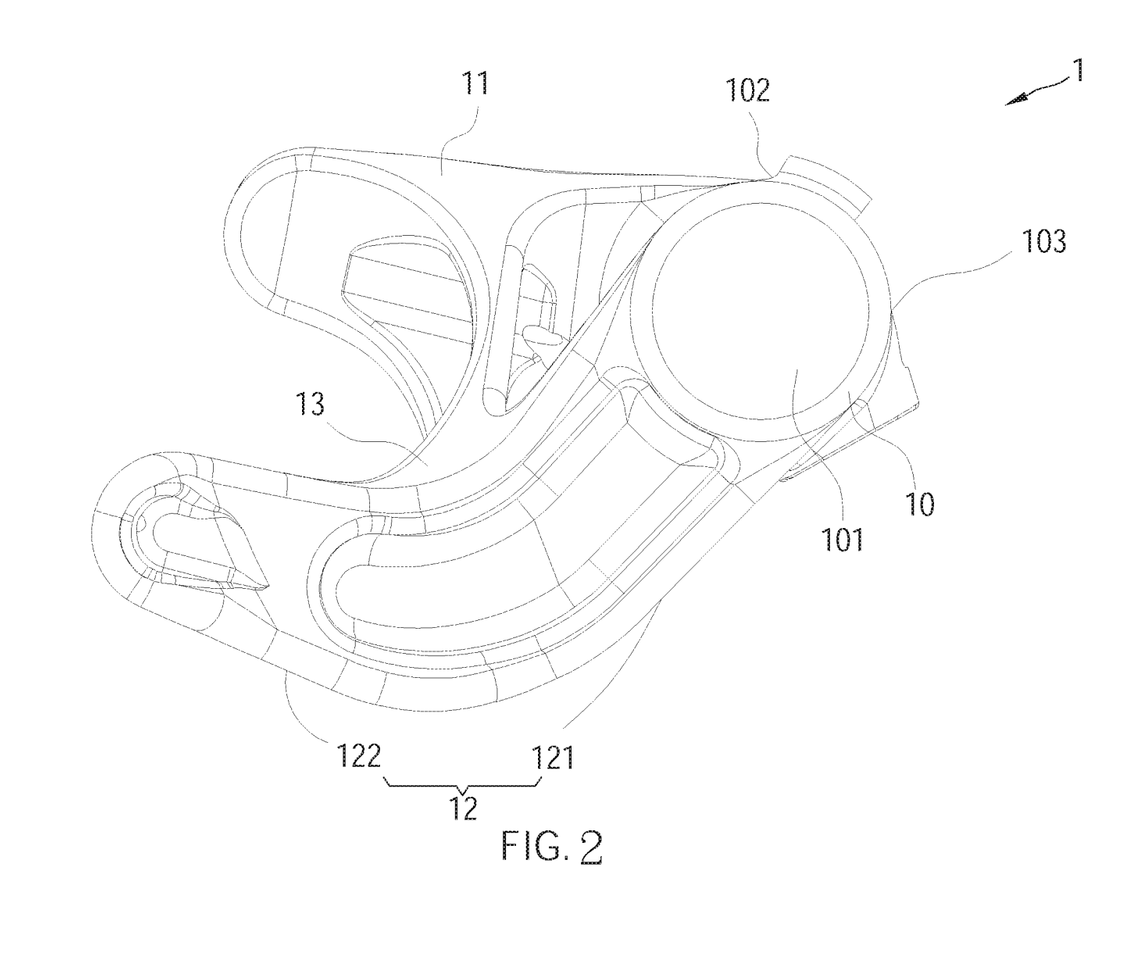
FIG. 2 is a side view of the bottom bracket of the embodiment according to the present invention.
Figure 3:
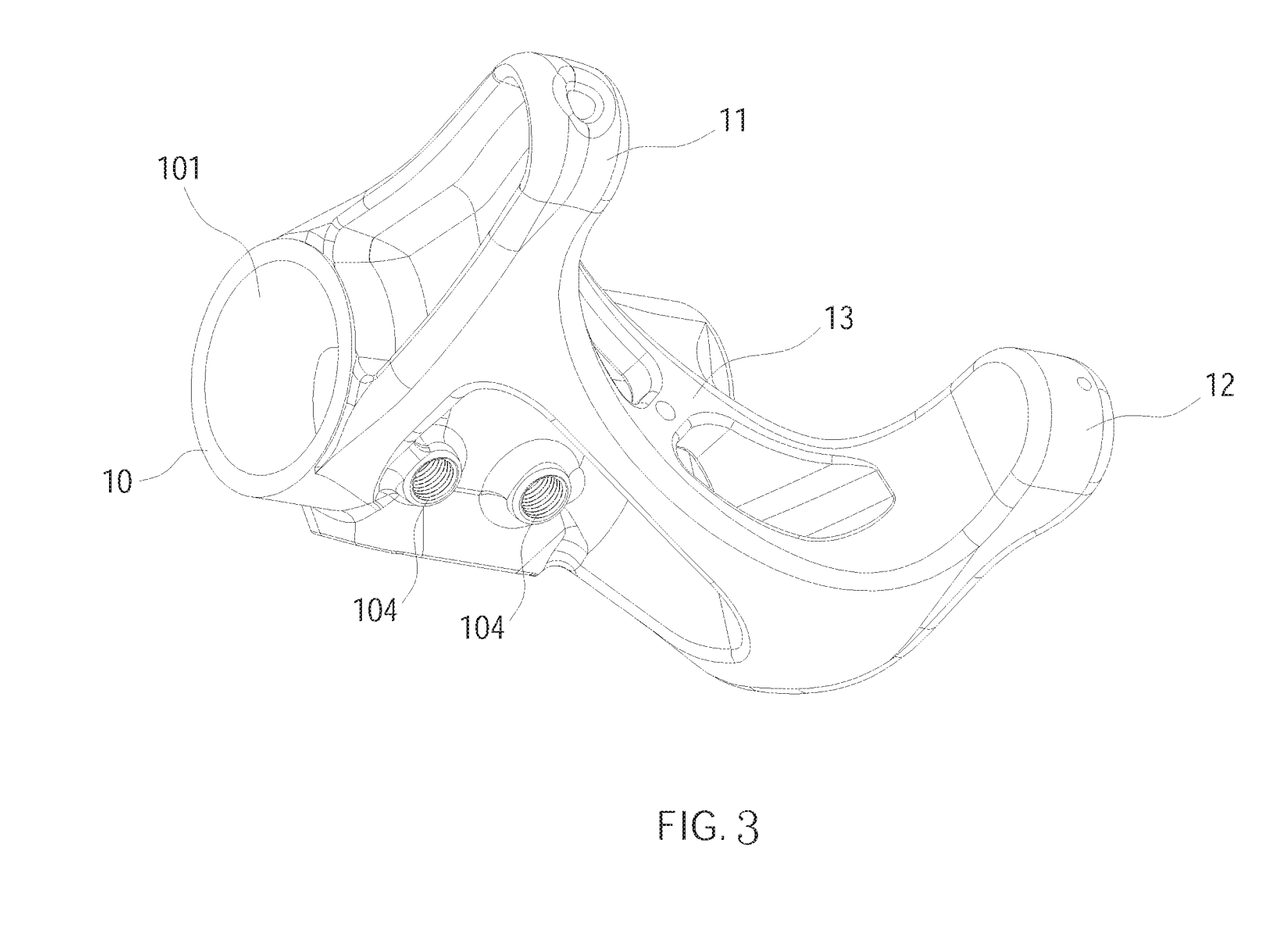
FIG. 3 illustrates a perspective view of the bottom bracket, shown from bottom up according to the embodiment.

The following illustrative embodiments and drawings are provided to illustrate the disclosure of the present invention, these and other advantages and effects can be clearly understood by persons skilled in the art after reading the disclosure of this specification. Referring to FIG. 1 to FIG. 3, a bottom bracket 1 of a bicycle frame according to a first embodiment of the present invention is disclosed. The bottom bracket 1 is integral and made of metallic material. By utilizing metallic material, the bottom bracket 1 can have better mechanical strength. In other embodiments, in addition to metallic material, other materials such as carbon fiber, plastic steel or other plastic materials also can be used to form the bottom bracket 1.

Figure 4:
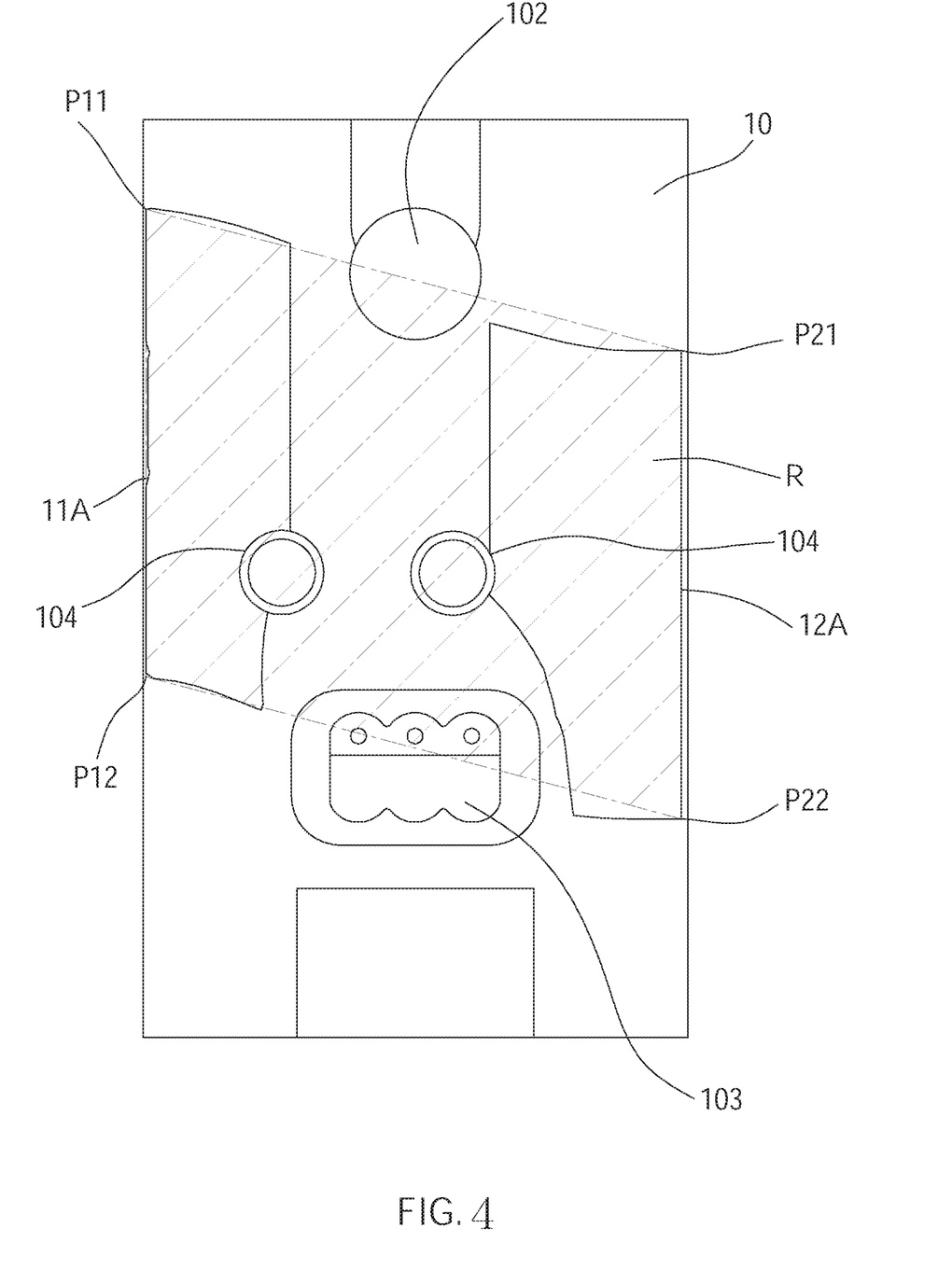
FIG. 4 is a plane view illustrating the body of the bottom bracket in an expanded state.

The bottom bracket 1 includes a body 10, a first joint arm 11 and a second joint arm 12 which respectively extend from the body 10 and are spaced apart from each other, and a blocking lever 13 disposed between the first joint arm 11 and the second joint arm 12. The body 10 has a left side and a right side through which are penetrated by a through hole 101. The body 10 further includes a top joint part 102 and a front joint part 103. The top joint part 102 is disposed on a top of the body 10, while the front joint part 103 is disposed on another side of the body 10 which is corresponding to the first joint arm 11 and the second joint arm 12. Further, the body 10 includes two joint holes 104 which are disposed between the first joint arm 11 and the second joint arm 12, wherein, the two joint holes 104 are threaded holes as an example. More detail, the first joint arm 11 and the second joint arm 12 are respectively connected to the body 10 via the joint ends 11A and 12A thereof. Further referring to FIG. 4, the two joint holes 104 are located within an area R enclosed by the two exterior points P11 and P12 of the joint end 11A and the two exterior points P21 and P22 of the joint end 12A when the first joint arm 11 and the second joint arm 12 connect to the body 10 of the bottom bracket 1.

In addition, the first joint arm 11 longitudinally extends in a predetermined direction. The second joint arm 12 extends toward a direction different from that of the first joint arm 11 and includes a first arm section 121 and a second arm section 122 which are connected in sequence. The first arm section 121 is connected to the body 10. The first arm section 121 and the second arm section 122 respectively extend toward different directions such that each of the first joint arm 11, the first arm section 121 and the second arm section 122 extends in a different direction from one another. Having the second joint arm 12 be designed with the first arm section 121 and the second arm section 122, and a bending portion be formed on the second joint arm 12, a length of the first joint arm 11 is not equal to that of the second joint arm 12. More detail, the length of the first joint arm 11 is shorter than that of the second joint arm 12. Additionally, the blocking lever 13 has two ends which are respectively connected to the interior sides of the first joint arm 11 and the second joint arm 12. Meanwhile, the blocking lever 13 includes a plurality of hollow parts 131 so that the blocking lever 13 can be made with light weight without affecting the mechanical strength thereof.

Figure 5:
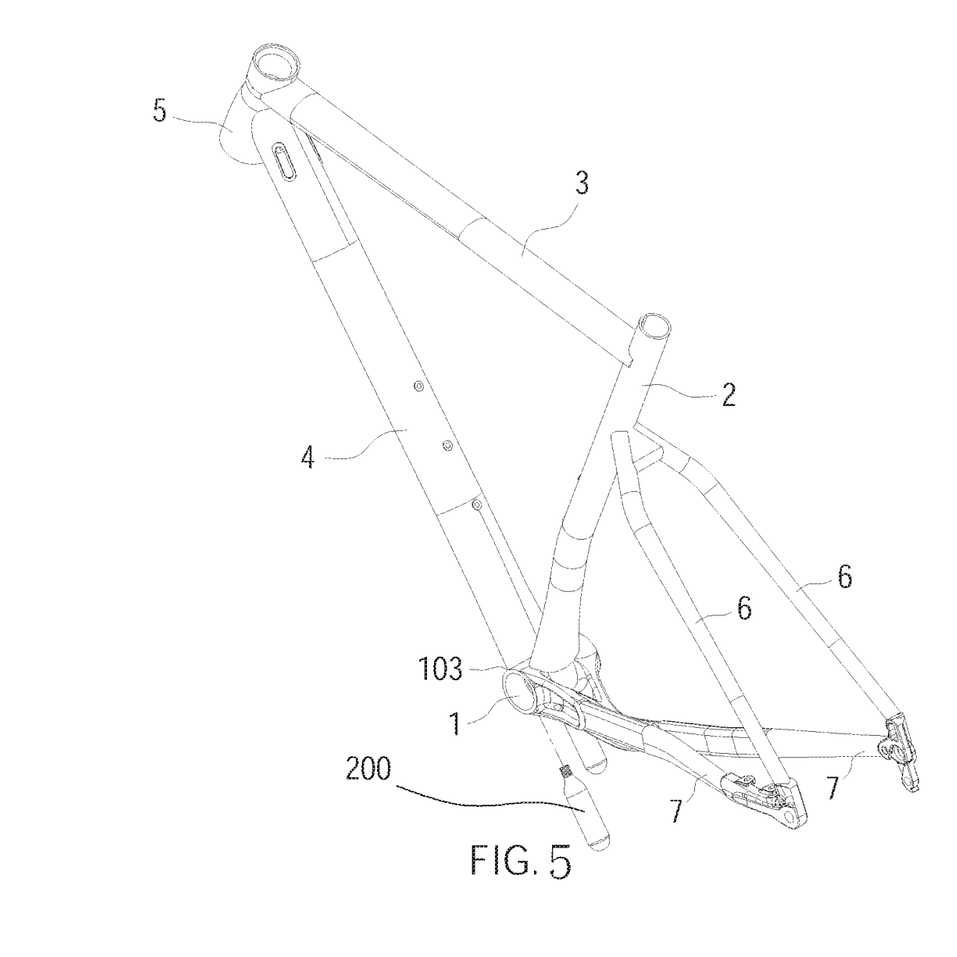
FIG. 5 is a perspective view of the bicycle frame of the embodiment according to the present invention.
Figure 6:
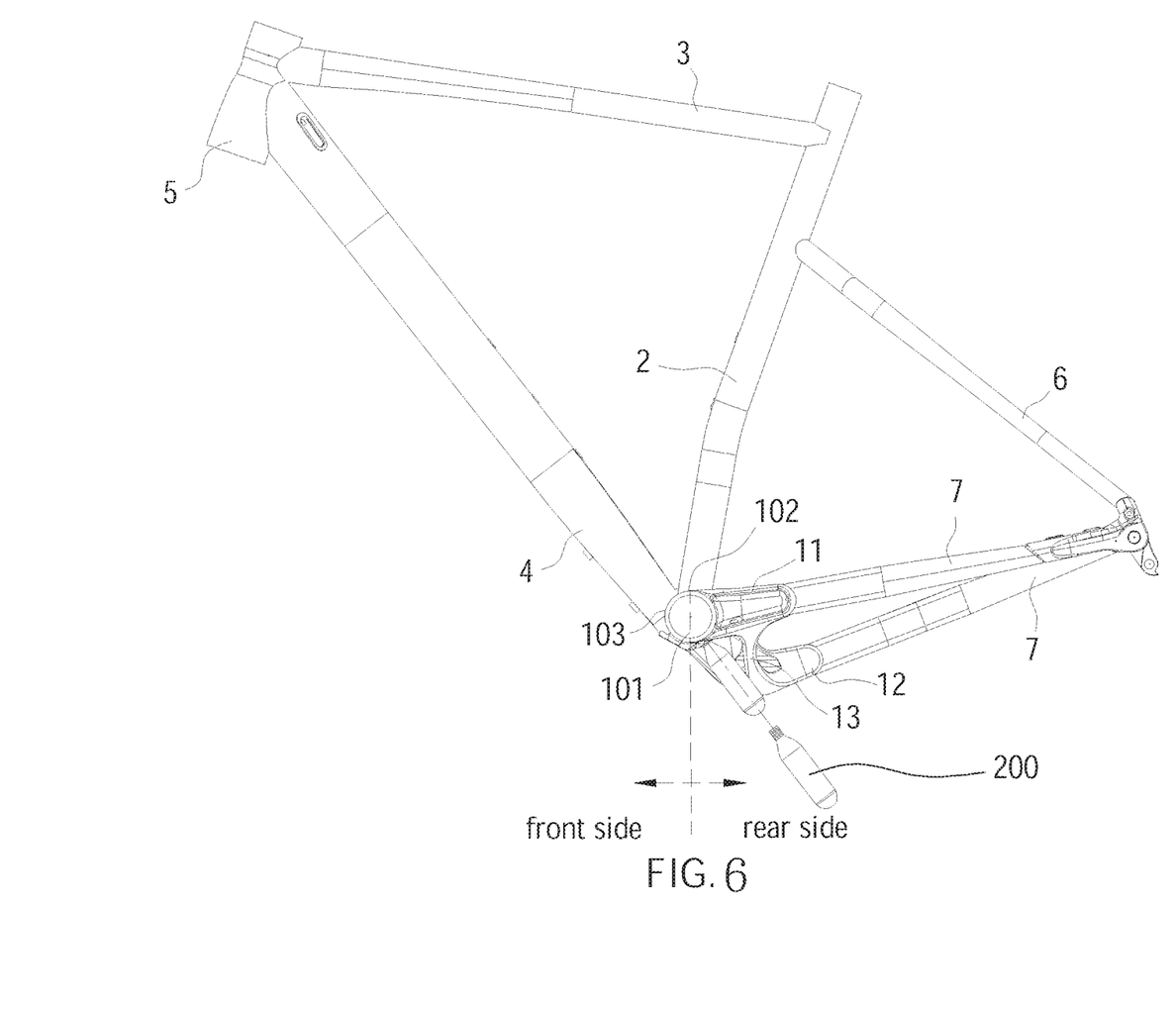
FIG. 6 is a side view of the bicycle frame of the embodiment according to the present invention.
Figure 7:
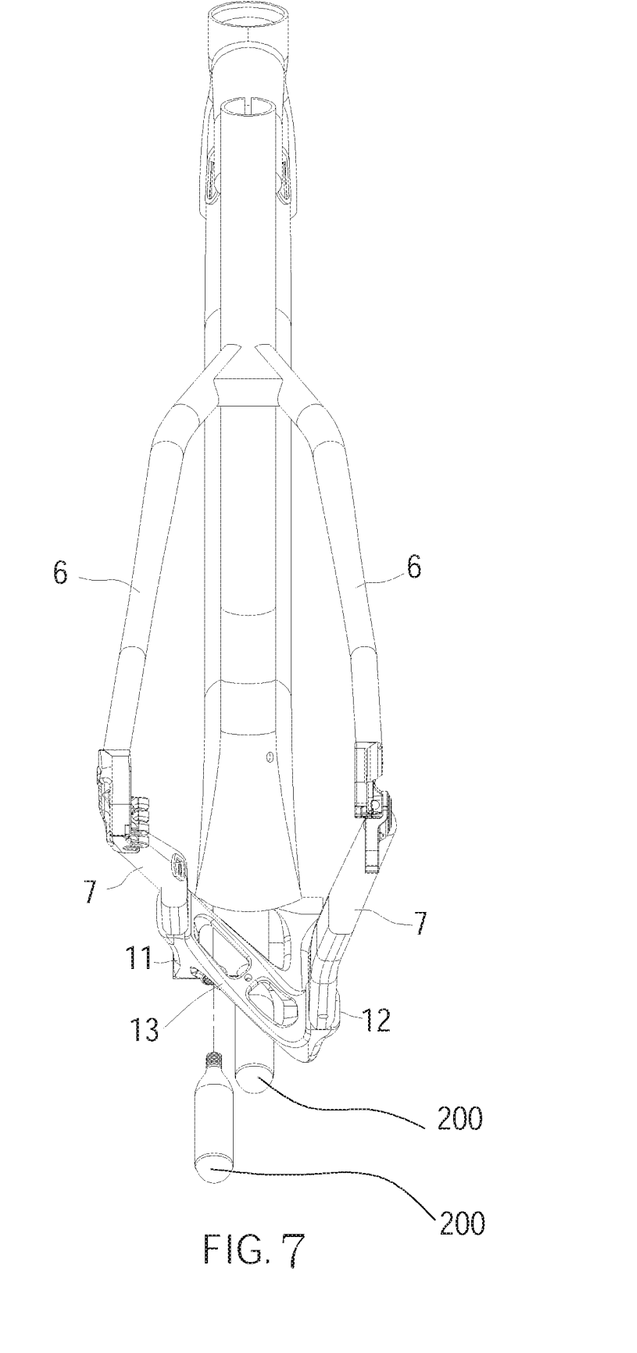
FIG. 7 is a rear view of the bicycle frame of the embodiment according to the present invention.

As illustrated in FIG. 5 to FIG. 7, after assembling the bottom bracket 1 with other frame parts to form a frame, a bicycle rider can directly equip two compressed air bottles with the frame, wherein the bottlenecks of the compressed air bottles are threaded as other commercialized products. More detail, in addition to the bottom bracket 1, the frame further includes a seat tube 2, a top tube 3, a down tube 4, a head tube 5, two seat stays 6 and two chain stays 7.

The seat tube 2 is connected to the top joint part 102 of the bottom bracket 1 such that the bottom bracket 2 is positioned at a lower section of the seat tube 2. The top tube 3 and the down tube 4 are both connected to the head tube 5, while the other ends of the top tube 3 and the down tube 4 are respectively connected to an upper section of the seat tube 2 and the front joint part 103 of the bottom bracket 1. In a forward direction of the bicycle, the head tube 5, the top tube 3, the down tube 4 are disposed at a front side of the seat tube 2. At the same side of the bicycle, each of the two seat stays 6 is connected to each of the two chain stays 7, respectively. The other ends of the two seat stays are further connected to the upper section of the seat tube 2, while the other ends of the chain stays are respectively connected to the first joint arm 11 and the second joint arm 12 of the bottom bracket 1. In the forward direction of the bicycle, the two seat stays 6 and the two chain stays 7 are located at a rear side of the seat tube 2. In this embodiment, it is worth to mention that the seat tube 2, the top tube 3 and the down tube 4 constitute a connection member which connects the bottom bracket 1 to the head tube 5 and enables the assembling of the frame of the bicycle. In addition to the structure mentioned above, in other embodiments, the connection member also can be constituted by the seat tube 2 and the top tube 3 only or formed with other structures which can connect the bottom bracket 1 to the head tube 5 and enable the assembling of the frame of the bicycle.

Figure 8:
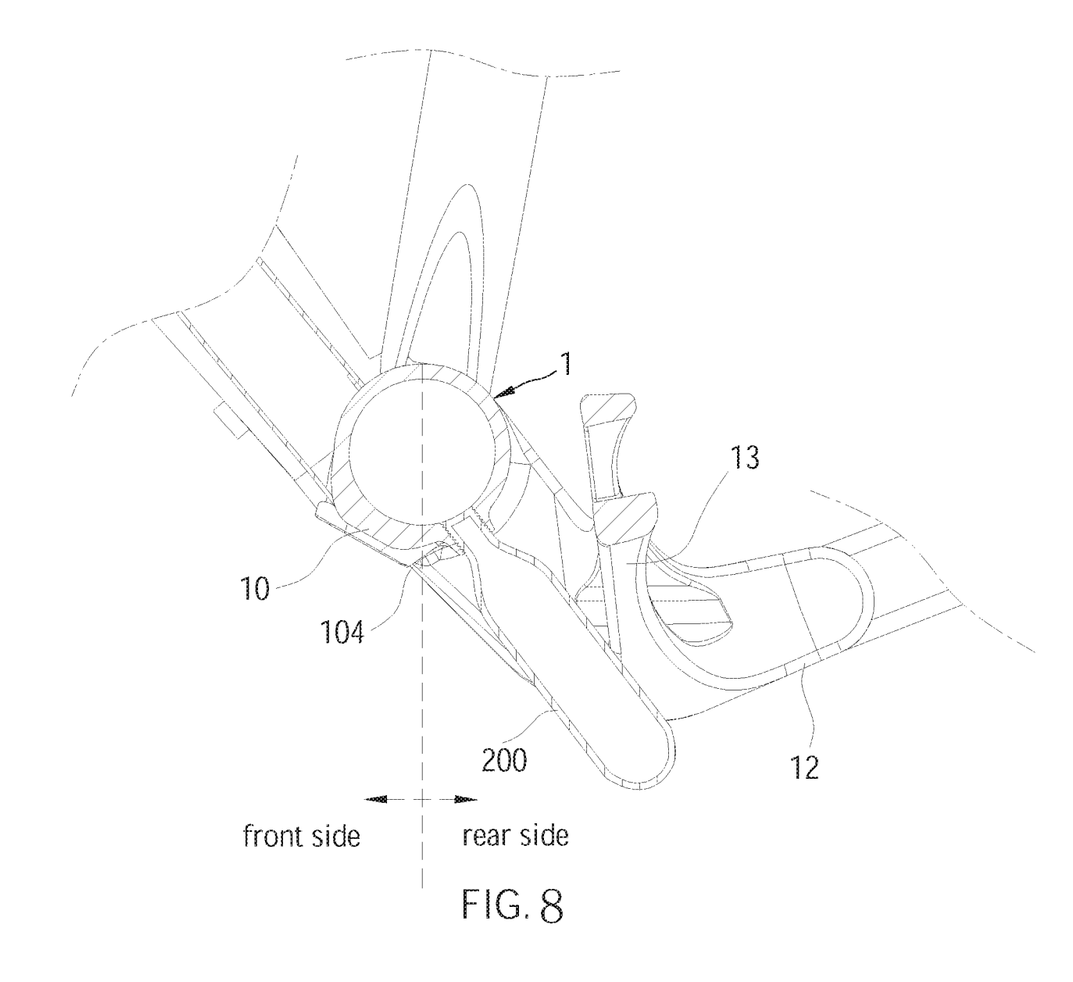
FIG. 8 is a partial cross-sectional view of the bicycle frame at the bottom bracket according to the embodiment of the present invention.

In this way, as illustrated in FIG. 8, by utilizing the design of the joint holes 104 and the locations thereof, and the engagement between the threads formed on the bottleneck of the two compressed air bottles 200 and the threads formed inside of the joint holes 103, the compressed air bottles 200 can be directly fixed to the bottom bracket 1 to fulfill the purpose of carrying the compressed air bottles 200 together with the frame. It is worth to mention that, as illustrated in FIG. 5, through the structure design to make the first joint arm 11 extend longitudinally and the second joint arm 12 bend, the first joint arm 11 is apart from the ground with a little higher height than that of the second joint arm 12 so that it is convenient for the bicycle rider to quickly assemble or release the compressed air bottles with respect to the bottom bracket 1 on benefit of the height difference.

In addition, as illustrated in FIG. 6, after assembling the compressed air bottles to the bottom bracket 1, the compressed air bottles 200 are positioned in a rear side of the bottom bracket 1 and are located below and within an area enclosed by the first joint arm 11, the second joint arm 12 and the two chain stays 7. Whereby, after the compressed air bottles being assembled to the bottom bracket 1, the first joint arm 11, the second joint arm 12 and the two chain stays 7 would be positioned at two sides of the compressed air bottles 200 such that it is effective to prevent the compressed air bottles 200 from being suddenly released because of hitting by surrounding objects at the two sides.

Additionally, after being assembled, the compressed air bottles 200 are not only located below the area enclosed by the first joint arm 11, the second joint arm 12 and the chain stays 7, part of the compressed air bottles 200 are also within a space enclosed by the body 10, the blocking lever 13, the first joint arm 11 and the second joint arm 12 to thereby block objects carried up by the tires and effectively reduce the possibility of the compressed air bottles 200 being hit by the objects.

In view of the above, by utilizing the joint holes 104 of the body 10, the blocking lever 13, the first joint arm 11 and the second joint arm 12 mentioned above, the present invention facilitates carrying the compressed air bottles 200 on a frame to which they can be assembled to the frame. A further feature provided includes assuring stability and the safety of the compressed air bottles 200 after being assembled to the frame. It must be pointed out that the embodiments described above are only some embodiments of the present invention. In other embodiments, the bottom bracket 1 also can include two joint arms which are joined to each other as long as the joint holes could be positioned within the area enclosed by the exterior points of the joint ends formed between the two joint arms and the body of the bottom bracket. All equivalent structures which employ the concepts disclosed in this specification and the appended claims should fall within the scope of the present invention.

What is claimed is:

1. A frame for a bicycle, which includes a head tube, a connection member, a bottom bracket, and two chain stays, wherein the connection member connects the head tube to the bottom bracket, while one end of each of the two chain stays is connected with the bottom bracket; in a forward direction of the bicycle, the head tube is located at a front side of the bottom bracket, while the two chain stays are located at a rear side of the bottom bracket; the frame is characterized in that:

the bottom bracket comprises a first joint arm, a second joint arm, a blocking lever, and at least one joint hole, wherein the at least one joint hole is adapted to receive a bottleneck of a compressed air bottle to secure the compressed air bottle to the frame, wherein when the compressed air bottle is secured to the bottom bracket, the compressed air bottle is located at the rear side of the bottom bracket;

wherein the first joint arm and the second joint arm are spaced apart from each other; the two chain stays are connected to the first arm and the second arm of the bottom bracket; the at least one joint hole is disposed between the first joint arm and the second joint arm; and wherein the blocking lever is disposed between the first joint arm and the second joint arm; the blocking lever has two ends respectively connected to the first joint arm and the second joint arm; part of the secured compressed air bottle is located within a space enclosed by the blocking lever, the first joint arm, and the second joint arm.

2. The frame of claim 1, wherein in a riding state of the bicycle, the secured compressed air bottle is located within an area enclosed by the bottom bracket and the two chain stays as viewed from a top of the connection member.

3. The frame of claim 1, wherein the bottom bracket comprises a body; the two chain stays are connected to a portion of the bottom bracket while the portion is joined to the body via two joint ends; the at least one joint hole is disposed on the body and the two joint ends extend along sides of the area that houses the joint hole to enclose the joint hole.

4. The frame of claim 1, wherein the blocking lever comprises at least one hollow part.

5. The frame of claim 1, wherein the bottleneck of the compressed air bottle comprises threads to be engaged with corresponding threads formed on an interior sidewall of the at least one joint hole.

6. The frame of claim 1, wherein the at least one joint hole is disposed between the two chain stays on the bottom bracket.

7. The frame of claim 1, wherein a length of the first joint arm is not equal to that of the second joint arm.

8. The frame of claim 1, wherein a material of the bottom bracket comprises metal, carbon fiber, plastic steel or plastic.

9. A bottom bracket for a frame of a bicycle, wherein the bottom bracket comprises a first joint arm and a second joint arm, a blocking lever, and at least one joint hole which is adapted to receive a bottleneck of at least one compressed air bottle to secure the compressed air bottle to the frame; when the at least one compressed air bottle is secured to the frame, the at least one compressed air bottle is located at the rear side of the bottom bracket;

wherein the first joint arm and the second joint arm are spaced apart from each other; the first joint arm and the second joint arm are respectively connected to two chain stays; the at least one joint hole is disposed between the first joint arm and the second joint arm;

wherein the blocking lever is disposed between the first joint arm and the second joint arm; the two side portions of the bottom bracket are respectively connected to the first joint arm and the second joint arm; after being secured to the frame, part of the compressed air bottle is located within a space enclosed by the blocking lever, the first joint arm and the second joint arm.

10. The bottom bracket of claim 9, wherein the blocking lever comprises at least one hollow part.

11. The bottom bracket of claim 9, wherein the bottom bracket comprises a body and is adapted to connected to the two chain stays; the two chain stays are connected to a portion of the bottom bracket which is joined to the body via two joint ends; the at least one joint hole is disposed on the body and the two joint ends extend along sides of an area that houses the at least one joint hole to enclose the at least one joint hole.

12. The bottom bracket of claim 9, wherein a length of the first joint arm is not equal to that of the second joint arm.

13. The bottom bracket of claim 9, wherein a material of the bottom bracket comprises a metal, carbon fiber, plastic steel or plastic.

14. A frame for a bicycle, which includes a head tube, a connection member, a bottom bracket, and two chain stays, wherein the connection member connects the head tube to the bottom bracket, while one end of each of the two chain stays is connected with the bottom bracket; in a forward direction of the bicycle, the head tube is located at a front side of the bottom bracket, while the two chain stays are located at a rear side of the bottom bracket; wherein the frame comprises:

the bottom bracket including a first joint arm, a second joint arm, and at least one joint hole which is adapted to receive a bottleneck of a compressed air bottle to secure the compressed air bottle to the frame; when the compressed air bottle is secured to the bottom bracket, the compressed air bottle is located at the rear side of the bottom bracket;

wherein the first joint arm and the second joint arm are spaced apart from each other; the two chain stays are connected to the first arm and the second arm of the bottom bracket; the at least one joint hole is disposed between the first joint arm and the second joint arm;

wherein a length of the first joint arm is not equal to that of the second joint arm.

15. The frame of claim 14, wherein in a riding state of the bicycle, the secured compressed air bottle is located within an area enclosed by the bottom bracket and the two chain stays as viewed from a top of the connection member.

16. The frame of claim 14, wherein the bottom bracket comprises a body; the two chain stays are connected to a portion of the bottom bracket while the portion is joined to the body via two joint ends; the at least one joint hole is disposed on the body and the two joint ends extend along sides of the area that houses the joint hole to enclose the joint hole.

\* \* \* \* \*